March 25, 1969 W. H. BIXBY 3,435,331
FILTERED ALTERNATING CURRENT VOLTAGE REGULATOR
Filed June 20, 1966

Inventor:—
William H. Bixby,
By Brown Jackson Boettcher & Dienner
Attys

United States Patent Office 3,435,331
Patented Mar. 25, 1969

3,435,331
FILTERED ALTERNATING CURRENT VOLTAGE REGULATOR
William H. Bixby, Columbus, Ohio, assignor, by mesne assignments, to New North Electric Company, Galion, Ohio, a corporation of Ohio
Filed June 20, 1966, Ser. No. 558,749
Int. Cl. H02p 13/06, 13/10; H02m 5/12
U.S. Cl. 323—45                 5 Claims

ABSTRACT OF THE DISCLOSURE

An AC voltage regulator for regulating the voltage of power supplied from a source to a load to maintain a substantially constant voltage across the load comprising a gapped booster transformer and a gapped filter transformer, each having a winding comprised of a first and a second portion, the first portion of the respective windings of the two transformers being connected in series with the source and the load, the first and second winding of the gapped filter winding being connected in series with a harmonic filter circuit across the turns of the booster transformer.

---

Figure 1:
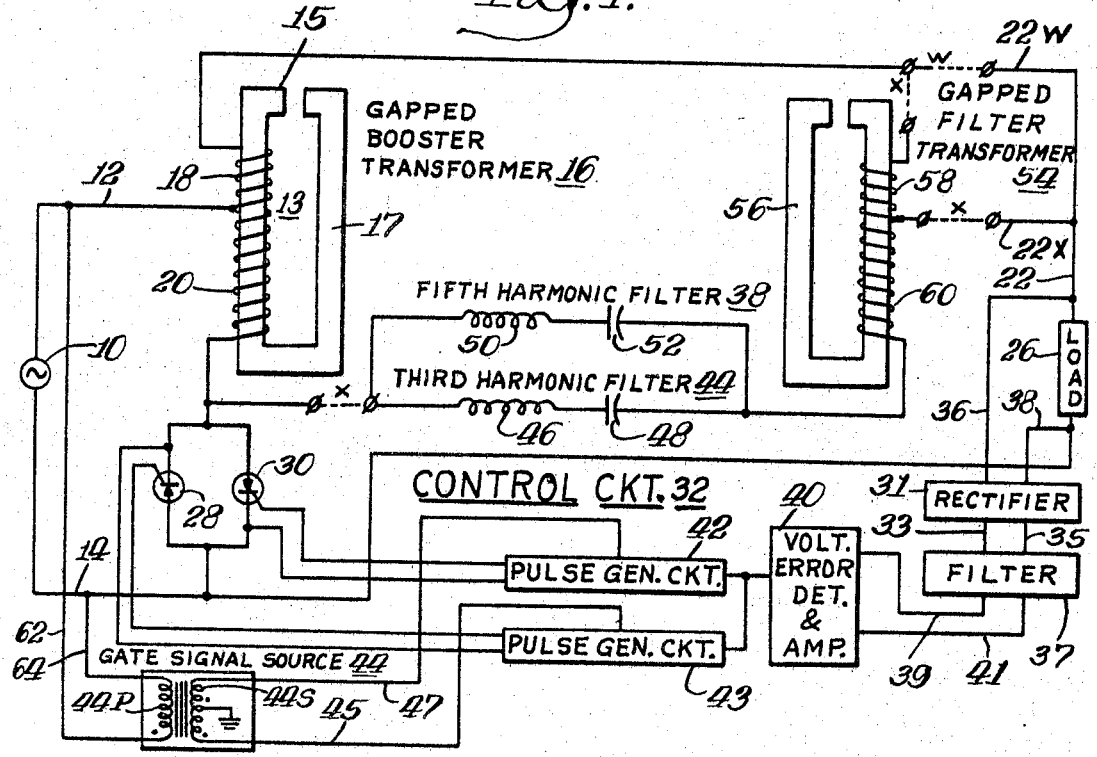

The present invention is directed to a novel circuit including silicon controlled rectifiers and a booster transformer for providing a regulated alternating current voltage output to a variable load from a source which provides a variable root-mean-square voltage. It is a particular object of the present invention to provide a regulator of such type which includes a novel circuit for minimizing harmonic distortion in the output waveforms.

There has been known in the art heretofore current supply apparatus for regulating the supply of current from an alternating current supply source to a variable load in such manner as to maintain the load voltage substantially constant. One improved form of such a regulator unit known in the art which has a high input power factor and a high efficiency, and which further utilizes a control circuit which requires a relatively small amount of power for control purposes, was set forth in U.S. Patent 2,709,779, which issued May 31, 1955 to W. H. Bixby.

In such arrangement a booster autotransformer is provided having a core which forms a flux path partly of magnetic material and partly of a series gap, the winding on the core comprising a first portion connected in a series circuit including the load and the supply source, and a second portion being connected in shunt of the load and series winding. A control circuit including a variable reactor, a magnetic amplifier and associated rectifying and load voltage sensing equipment, supplies current from the supply source to the second winding portion shunt circuit in varying amounts to maintain the voltage across the load at a substantially constant value.

Although such arrangement provided an improved form of voltage regulation for a variable load, the bulky, heavy and cumbersome nature of certain of the magnetic components required to achieve the improved form of control indicated a need for a different control arrangement.

It is an object of the invention therefore to provide a system which includes a booster autotransformer for providing the desired regulation, and a control circuit for the autotransformer including a pair of silicon controlled rectifiers and associated pulse generator equipment which requires less space, is of reduced weight, and which specifically eliminates the more cumbersome components such as the saturable reactor and magnetic amplifier of the previously known system.

It has been found, however, that in one novel system which achieved the desired control, the output waveshape had a harmonic content such as to give harmonic distortion in the order of 16% of the root-mean-square value of the wave. In certain types of electronic apparatus, harmonic distortion of such magnitude may be undesirable, if not unsuitable, and it is another object of the present invention to provide a new and novel filter circuit for use with such system (as well as in other circuit arrangements including the arrangement of my above identified patent).

It is a specific object of the invention to provide such arrangement which utilizes a relatively simple and practical circuit for reducing the harmonic distortion in the output waveshape of a voltage regulator circuit.

Figure 2:
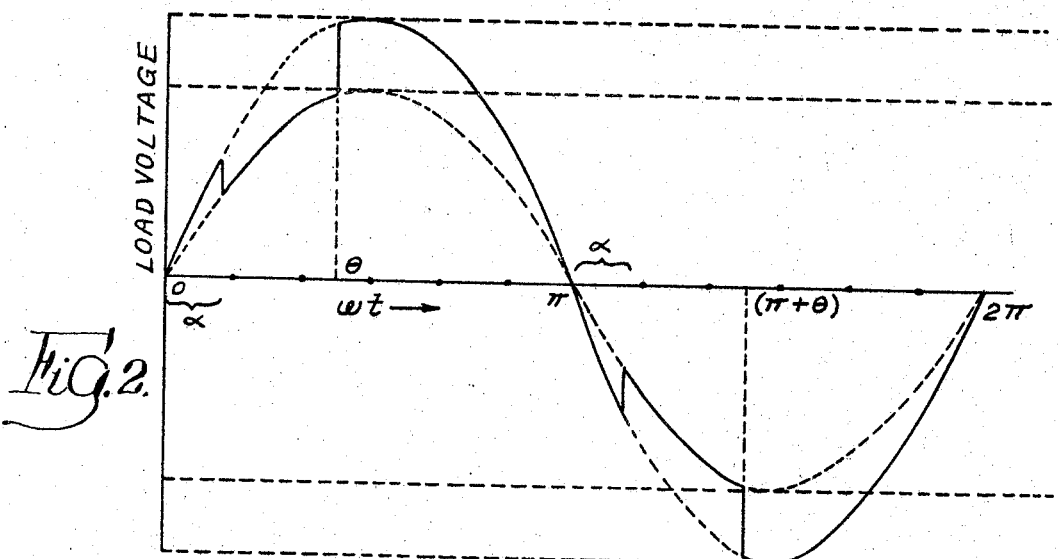

These and other objects of the invention will be apparent from the following description and accompanying drawings which serve to illustrate various exemplary embodiments thereof and in which:

FIGURE 1 sets forth a novel regulator circuit using silicon controlled rectifiers for achieving the improved form of voltage control including the novel filter arrangement for minimizing harmonic distortion; and FIGURE 2 illustrates the fundamental output waveshape provided by the circuit resulting from the firing of the silicon controlled rectifiers as delayed by the angle $\theta$.

GENERAL DESCRIPTION

The novel regulator is shown in FIGURE 1 as having a pair of input conductors 12, 14 connected to an alternating current source 10 which may comprise any conventional source which provides a variable root-mean-square output voltage. A gapped booster transformer 16 is provided which has a core 17 of magnetic material which forms a flux path having therein a series gap (or gaps) 15 devoid of magnetic material in its magnetic path which gap is adjusted in size in a manner to be described. In the basic embodiment to be first described assuming w-wiring connected and x-wiring disconnected (i.e., without incorporating the harmonic filtering equipment), a winding 13 on the core 17 comprises a series portion 18 connected in series with the source 10 and load 26 by the conductors 12, 22w, 22 and 14; and a second portion 20 connected to a pair of silicon controlled rectifiers 28, 30 for selective connection thereby across or in shunt of the source 10. As will be shown, the silicon controlled rectifiers 28, 30 are selectvely triggered into combustion during alternate half cycles by an associated control circuit 32. Adjustment of the period of delay in each half cycle prior to triggering of the effective one of the rectifiers effects a corresponding variation in the current flow over the shunt circuit including winding portion 20 and thereby a corresponding adjustment of the load voltage. Since the silicon controlled rectifiers 28, 30 are connected across the source conductors 12, 14, and the source voltage reverses every half cycle, the turning off of the enabled one of the silicon controlled rectifiers is hastened by the reversal of the source voltage at the end of each half cycle; the actual turning off thereof being controlled by the dying out of the inductive current from winding 20 at some angle $\alpha$ in the succeeding half cycle.

Control circuit 32 which provides the timed pulses for effecting selective variation of the current flow in the shunt circuit is generally of the type set forth in the co-pending application of Patrick L. Hunter, which was filed on Nov. 9, 1964, and received Ser. No. 409,855, now U.S. Patent No. 3,351,838, and was assigned to the assignee of this invention. As shown in FIGURE 1, the control circuit 32 basically comprises a rectifier 31 having its input conductors 36, 38 connected across the load 26 to provide a direct current voltage, the value of which varies with changes in the load voltage. The voltage provided by the rectifier 31 is connected over conductors 33, 35 to filter 37, which removes AC ripple. The direct current filtered output of filter 37 is connected over conductors 39, 41 to a voltage error detector and amplifier circuit 40 which is shown in detail in the above identified application.

The rectifier-filter-error detector combination can supply a signal to the pulse generating circuits, the value of which is proportioned to either the (1) peak value of the AC output voltage supplied to the load; (2) the rectified average value of this voltage; or (3) the root-mean-square value of this voltage by the employment of techniques well known in the art, the choice of which would be determined by which characteristic of the load it is desired to hold constant.

Briefly, with an increase in the value of the load voltage from a predetermined value, the circuit 40 provides an output error signal therefrom of increased value, and with a decrease in the load voltage from such value the circuit 40 provides an output error signal therefrom of decreased value. The magnitude of the error signal produced by the voltage error detector and amplifier 40 is fed to a pair of pulse generator circuits 42, 43, also shown in such application, each of which in turn provides an output pulse in different half cycles to the control element of an associated one of the silicon controlled rectifiers 28, 30, the time of pulse output in each half cycle being delayed relative to the start of the half cycle by an amount related to the magnitude of the error signal.

A gate signal source 44 comprising a primary winding 44P connected to the alternating source 10 over conductors 62, 64 and a grounded center tap secondary winding 44S provides gating signals over conductors 47, 45 to the pulse generators 42, 43 at the start of each half cycle to initiate the timing interval for the pulse generators. As noted above, the reversal of the source voltage at the end of a half cycle tends to turn off the conducting one of the silicon controlled rectifiers 28, 30 which by reason of the gapped booster transformer winding 20 connected thereto maintains a current flow for a brief period into the next half cycle as indicated by the angle $\alpha$ in FIGURE 2. For purposes of brevity, in the further description relating to the silicon controlled rectifiers, turn off overshoot will be assumed without further discussion thereof. The silicon controlled rectifier which is turned off remains in such condition until a further pulse is applied to its control element by the associated pulse generator. With both silicon controlled rectifiers turned off, no current flow will occur over the winding portion 20.

Each gate signal provided by gate signal source 44 over the conductor 47, for example, is accurately spaced 180 degrees from the preceding gate signal over conductor 45 to insure accurate phasing of the control signals output from the pulse generators 42, 43, a signal being fed to alternate pulse generator circuits 42, 43 each time the alternating voltage from source 10 goes from positive to negative or negative to positive in a cycle.

Assuming that at the beginning of the positive half cycle of the source voltage, the voltage on conductor 62 goes positive with respect to conductor 64, the voltage on the conductor 47 to the pulse generator circuit 42 becomes negative. At the beginning of the next half cycle, as the voltage on conductor 64 goes positive with respect to voltage on conductor 62, conductor 45 becomes negative to provide a negative signal to pulse generator circuit 43.

As noted above, the pulse generators 42, 43 will initiate a pulse to each of the gates 28, 30 an interval after the respective conductors 47, 45 become negative which interval is of a length determined by the value of the error signal received from the voltage error and detector circuit 40; an error signal of a larger value resulting in an increased delay in firing of the silicon controlled rectifier, and an error signal of reduced value resulting in a decreased delay period.

With reference once more to the booster transformer 16, the gap 15 has a magnitude which is adjusted so that (a) with full load current flowing and (b) the silicon controlled rectifiers 28, 30 nonconducting (the rectifiers for example will be nonconducting with a high voltage at the source), the voltage across the second winding portion 20 of transformer 16 will be approximately equal in magnitude to the maximum voltage of source 10. With the gap so adjusted, and letting the number of turns in winding 18 be $N_1$ and the number of turns in winding 20 be $N_2$, letting $N_2/N_1=3$ for example, the voltage induced in the winding portion 18, with full load current flowing and the silicon controlled rectifiers nonconducting, will be approximately one-third of the source voltage.

With a resistive load, this voltage will be in quadrature with the voltage appearing across the load 26, and the voltage appearing at the load terminals will be $$\sqrt{1^2-\frac{1^2}{3}}=\frac{2\sqrt{2}}{3}=0.94280$$

times the source voltage. With the silicon controlled rectifiers 28, 30 turned completely on, the voltage at the load terminals will be approximately 1⅓ times the voltage of source 10. Such control range will be adequate for maintaining a substantially constant R.M.S. voltage at the load terminals with a source voltage which might vary as much as plus or minus twelve percent from its normal value.

With reference to FIGURE 2, the fundamental output waveshape under full load conditions with the firing of the silicon controlled rectifiers 28, 30 delayed by an angle of $\theta$ from the start of the positive and negative half cycles is shown thereat.

Although a silicon controlled rectifier may be fitted at an angle $\theta$ which may be varied from the beginning to the end of the half cycle, inductive current will maintain the silicon controlled rectifier in conduction during an angle $\alpha$ into the next half cycle which varies with the energy stored in the booster transformer. Conduction of the alternate silicon controlled rectifier will be at angle $\theta$ or $d$ according as $\theta$ is greater or less than $\alpha$. For satisfactory operation, the duration of the pulse from the pulse generator circuits should be greater than the maximum value of $\alpha$.

Pulse generators 42 and 43, in effecting the selective enablement of the silicon controlled rectifiers 28, 30 in alternate half cycles after a delay determined by the error signal from circuit 40, control the amount of current which flows through the shunt path including the second winding portion 20 of the gap booster transformer 16 as is now more fully described.

Assuming that conditions of load and line are such that the load voltage tends to increase to the extent that an error signal of maximum value results, the maximum time delay will occur and the silicon controlled rectifiers 28, 30 will be turned off for the entire cycle. In such event, the load voltage will be the vector difference of the source voltage and the voltage across winding 18.

If the conditions of load and/or line are such that the load voltage thereafter tends to decrease, the voltage error and detector circuit 40 provides an error voltage of a decreased value to the pulse generator circuits 42, 43 which results in a corresponding decrease in the delay period for the time of enablement of the silicon controlled rectifiers in their respective half cycles. With the silicon controlled rectifiers 28, 30 conducting for longer periods in their respective half cycles increased current flows over the shunt circuit including the second winding portion 20 of the gap booster transformer 16, and the magnitude (and phase) of the voltage across the series portion 18 of the booster transformer changes so as to minimize the assumed decrease of load voltage, the load voltage being equal to the vector sum of the voltage of source 10 and the voltage across the series portion 18 of the booster transformer 16.

If the load voltage tends to increase, the voltage error and detector circuit 40 provides a signal of a correspondingly increased value to the pulse generator circuits 42, 43, and a correspondingly increased amount of delay is provided to the silicon controlled rectifiers 28, 30 for operation in respective half cycles. As a result the firing angle of the silicon controlled rectifiers 28, 30 is increased, and the amount of current transmitted over the shunt path including the second winding portion 20 is correspondingly reduced. Accordingly the magnitude (and phase) of the voltage across the series winding portion 18 of the gap booster transformer 16 changes so as to minimize the assumed rise of load voltage.

It is seen from the foregoing description that the improved form of regulation achieved by an arrangement such as set forth in U.S. Patent 2,709,779, which was issued to me on May 31, 1955, is also achieved by the novel and less complex circuit of the invention which utilizes a pair of relatively inexpensive silicon controlled rectifiers 28, 30. The novel arrangement in addition to achieving this improved form of control results in the elimination of the more complex and expensive components including a magnetic amplifier and a saturable reactor. In addition, as will now be shown, an improved output waveshape is achieved by the provision of a novel filter circuit which has application in the reduction of harmonic distortion in the arrangement set forth herein and also in my above identified patent.

*Filter circuit for use with regulator device*

With reference now to FIGURE 1, the basic circuit arrangement described above is modified to provide an improved output waveshape by use of the $x$-wiring in lieu of the $w$-wiring, and the connection in the circuit by the $x$-wiring of a second gapped filter transformer 54 which comprises a core 56 and a winding including a first winding portion 58 and a second winding portion 60. The series winding portion 58 is connected in series with the first winding portion 18 of the booster transformer 16 between the alternating current source 10 and the load 26. The second winding portion 60 is connected between the first winding portion 58 and over a plurality of harmonic filter circuits 38, 44 to the lower end terminal of the second winding portion 20 of the gapped booster transformer 16. Stated in another manner, the gapped filter transformer 54 is connected in series with the harmonic filters 38, 44 across the total turns of the booster transformer 16.

The third harmonic filter circuit 44 includes a series inductance 46 and a capacitor 48, and the fifth harmonic filter circuit 38 includes a series inductance 50 and capacitor 52 connected in parallel with the third harmonic filter 44.

It can be shown by analysis of the harmonics in the waveform output from the regulator without the filter network (i.e., with $w$-wiring) that the major contribution to the harmonic distortion results from the third harmonic component, and the second major component results from the fifth harmonic. Removal of these two components from the output waveforms results in a voltage waveshape with well under five percent total harmonic distortion.

Using an alternating current source 10 which is relatively free from harmonic distortion, any distortion components appearing at the terminals of load 26 must obviously be introduced in the series winding portion 18 of gap booster transformer 16. Since transformer 16 is tightly coupled, any voltage appearing across the turns of the series winding portion 18 will appear amplified by the ratio $N_1+N_2/N_1$ across the entire winding of booster transformer 16.

With reference now to the filter transformer 54, letting the number of turns of winding portion 60 be designated $N_{2F}$ and the number of turns of winding portion 58 be designated $N_{1F}$, the turns ratio $N_{2F}/N_{1F}$ of the filter transformer 54 is made equal to the turns ratio $N_2/N_1$ of the booster transformer 16. Additionally, the series inductance 46 and capacitor 48 of the third harmonic filter 44 are proportioned so as to be series resonant at the third harmonic frequency, whereby the third harmonic filter 44 will offer very nearly zero impedance to the flow of any current at that frequency. As a result, practically no third harmonic voltage will appear across the series combination of inductance 46 and capacitor 48, and practically all of the third harmonic voltage present at the terminals of the booster transformer 16 will be directly applied to the terminals of the filter transformer 54.

Since the turns ratio $N_{2F}/N_{1F}$ of the filter transformer has been made equal to the turns ratio $N_2/N_1$ of the booster transformer 16, the third harmonic voltage across winding 58 of the filter transformer 54 will be equal and opposed to the third harmonic voltage across winding 18 of the booster transformer 16, whereby the third harmonic voltage introduced by transformer 16 is substantially eliminated. Consequently the third harmonic voltage appearing at the load terminals should equal the third harmonic voltage component present in the alternating current source which has been assumed to be very nearly zero.

The magnitude of the third harmonic voltage appearing across the lower winding 20 of the booster transformer 16 may be determined and used to establish the upper limit of this voltage for the most unfavorable firing angle $\theta$. By adjusting the gap of the filter transformer 54 so as to pass the maximum desired third harmonic current through the capacitor 48 under this condition, the voltage impressed on capacitor 48 will be tolerable under all normal conditions of load and line.

If capacitor 48 has a sufficiently large volt ampere rating at the third harmonic frequency, the voltage drop appearing across the winding 58 of the filter transformer 54 of fundamental frequency under full load conditions will be sufficiently small as to have a negligible effect upon the magnitude of the output voltage.

By proportioning the inductance 50 and capacitor 52 in the fifth harmonic filter 38 to provide series resonance at the fifth harmonic frequency, the load voltage will be as free of the fifth harmonic voltage component as is the source voltage.

Selected values for a 1000 v.a. line voltage regulator to operate from a sixty cycle source with line voltage from 106 to 134 volts R.M.S. giving an output voltage adjustable over the range from 134 to 140 v. R.M.S. are given below:

Turns ratio in booster and filter transformer $$\frac{N_2}{N_1}=\frac{N_{2F}}{N_{1F}}=3.08$$

Inductance of total winding of booster transformer: $L_B=0.195$ henry.

Inductance of total winding of filter transformer: $L_F=0.0426$ henry.

Capacitance in third harmonic filter: $C_3=5.00$ microfarads 440 v. A.C., 60 c.p.s., pyranol.

Inductance in third harmonic filter: $L_3=0.1564$ henry.

Capacitance in fifth harmonic filter: $C_5=1.00$ microharad, 440 v. A.C., 60 c.p.s., pyranol.

Inductance in fifth harmonic filter: $L_5=0.2815$ henry.

When operating from a 120 volt sinusoidal voltage source and delivering 1,000 volt-amperes at 137 volts to a resistance load, the circuit gave the following values for total harmonic distortion:

Without filter, $H.D.=16.23$ percent.
With third harmonic filter added, $H.D.=5.54$ percent.
With third and fifth harmonic filters, $H.D.=4.01$ percent.

What is claimed is:

1. In an alternating current voltage regulator for regulating the voltage of power supplied from a source to a load to maintain a substantially constant voltage across the load, a gapped booster transformer having a winding including a first and a second winding portion, a gapped filter transformer having a first and a second winding portion, means connecting said first winding portion of said gapped booster transformer and said gapped filter transformer in series with said source and said load, shunt means connecting said second winding portion of said gapped booster transformer in shunt across said source, control means for said shunt means connected across said load to vary the amount of current flow over said shunt means and said second winding portion of said gapped booster transformer with changes in said load voltage in a load voltage regulating manner, harmonic filter means, and means connecting said harmonic filter means to said second winding portion on said gapped booster transformer and in series with said first and second portion of said filter transformer winding, said harmonic filter means and said filter transformer winding being thereby connected in series across the first and second portion of said booster transformer winding.

2. A regulator as set forth in claim 1 in which said harmonic filter means includes means tuned to be series resonant at the third harmonic frequency whereby substantially all of the third harmonic voltage across the booster transformer winding will be applied directly across said filter transformer winding, and said first and second winding portions on said gapped filter transformer have a turns ratio substantially equal to the turns ratio of said first and second winding portion on said gapped booster transformer, whereby the harmonic voltage across said filter transformer winding will be equal and opposite to the third harmonic voltage across said booster transformer winding to provide substantially zero third harmonic voltage across the load.

3. A regulator as set forth in claim 1 in which said means connecting said first winding portions of said gapped booster transformer and said gapped filter transformer in series comprises a conductive means connected between one end of said windings on said gapped booster transformer and said gapped filter transformer, and in which said means connecting said harmonic means to said booster and filter transformer windings comprises conductive means connecting said harmonic means between the second ends of said windings on said gapped booster transformer and said gapped filter transformer.

4. An alternating current voltage regulator as set forth in claim 1 in which said shunt means includes switching means and said control means vary the firing angle of said switching means to vary the current flow over said shunt means, and in which the upper limit of the third harmonic voltage appearing across the second portion of said gapped booster transformer winding is determined for the most unfavorable firing angle of said switching means, and in which said gap on said filter transformer is adjusted to pass a selected maximum third harmonic current for such condition.

5. An alternating current voltage regulator as set forth in claim 1 in which said shunt means includes switching means which are turned on and off by said control means, and in which the gap on said booster transformer is adjusted so that with full load current and said switching means turned off, the voltage across said second winding portion will be approximately equal in magnitude to the maximum voltage of said source, and in which said harmonic filter means comprise means proportioned to be series resonant at a given harmonic frequency, whereby the voltage at said given harmonic frequency which is present across said gapped booster transformer is applied directly across said gapped filter transformer.

References Cited

UNITED STATES PATENTS

| | | | |
|---|---|---|---|
| 2,709,779 | 5/1955 | Bixby | 323—66 |
| 2,722,655 | 11/1955 | Anderson | 323—45 X |
| 3,129,380 | 4/1964 | Lichowsky | 323—45 |
| 3,270,270 | 8/1966 | Yenisey | 321—18 |
| 3,286,159 | 11/1966 | Kuba | 323—45 |
| 3,295,053 | 12/1966 | Perrins | 323—24 X |
| 3,344,341 | 9/1967 | Bolton | 323—45 |
| 3,351,838 | 11/1967 | Hunter | 321—11 X |

LEE T. HIX, *Primary Examiner.*

G. GOLDBERG, *Assistant Examiner.*

U.S. Cl. X.R.

323—24, 62, 66